United States Patent
Hosono

(10) Patent No.: US 8,526,343 B2
(45) Date of Patent: Sep. 3, 2013

(54) OPERATION FREQUENCY SETTING METHOD, NETWORK DEVICE AND RADIO BASE STATION

(75) Inventor: Hiroyuki Hosono, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 226 days.

(21) Appl. No.: 12/994,834

(22) PCT Filed: May 27, 2009

(86) PCT No.: PCT/JP2009/059660
§ 371 (c)(1),
(2), (4) Date: Feb. 23, 2011

(87) PCT Pub. No.: WO2009/145213
PCT Pub. Date: Dec. 3, 2009

(65) Prior Publication Data
US 2011/0134844 A1   Jun. 9, 2011

(30) Foreign Application Priority Data
May 27, 2008   (JP) .................................. 2008-138008

(51) Int. Cl.
H04B 7/00   (2006.01)
(52) U.S. Cl.
USPC ........................................ 370/310.2; 370/328
(58) Field of Classification Search
USPC .................. 370/328, 310.2; 455/452.2, 456.2
See application file for complete search history.

(56) References Cited

U.S. PATENT DOCUMENTS

| | | | |
|---|---|---|---|
| 5,579,373 A * | 11/1996 | Jang .............................. | 455/436 |
| 5,652,752 A * | 7/1997 | Suzuki et al. ................. | 370/330 |
| 7,412,254 B2 * | 8/2008 | Senarath et al. .............. | 455/522 |
| 7,639,637 B2 * | 12/2009 | Honjo et al. ................. | 370/310.2 |
| 7,826,852 B2 * | 11/2010 | Kobayashi .................... | 455/450 |
| 8,010,161 B2 * | 8/2011 | Umeda et al. ................. | 455/561 |
| 2002/0027891 A1 * | 3/2002 | Mimura ........................ | 370/331 |
| 2007/0287501 A1 * | 12/2007 | Hoshina et al. ............. | 455/562.1 |
| 2009/0203377 A1 * | 8/2009 | Kawasaki .................. | 455/435.1 |
| 2012/0257553 A1 * | 10/2012 | Noh et al. ..................... | 370/280 |

FOREIGN PATENT DOCUMENTS

| | | |
|---|---|---|
| JP | 4 91522 | 3/1992 |
| JP | 2007 235683 | 9/2007 |
| JP | 2007 329758 | 12/2007 |
| JP | 2008 270915 | 11/2008 |
| WO | WO 2007/040453 A2 | 4/2007 |
| WO | WO 2007/040453 A3 | 4/2007 |

OTHER PUBLICATIONS

Office Action issued Dec. 5, 2012 in Chinese Patent Application No. 200980119743.8 (with English-language translation).

(Continued)

*Primary Examiner* — Ricky Ngo
*Assistant Examiner* — Dewanda Samuel
(74) *Attorney, Agent, or Firm* — Oblon, Spivak, McClelland, Maier & Neustadt, L.L.P.

(57) ABSTRACT

A mobile communication method includes an operation frequency setting method for setting an operation frequency of a radio base station including measuring by the radio base station a received power level of a common control signal transmitted by each of neighboring radio base stations, and comparing each of the measured received power levels of the common control signals with a prescribed threshold and determining an operation frequency of the radio base station from among operation frequency candidates from which a frequency of a common control signal having a received power level higher than the prescribed threshold is excluded.

12 Claims, 5 Drawing Sheets

(56) References Cited

OTHER PUBLICATIONS

Japanese Office Action issued Nov. 13, 2012 in Patent Application No. 2010-514508 with English Translation.

International Search Report issued Aug. 25, 2009 in PCT/JP09/059660 filed May 27, 2009.

* cited by examiner

| NEIGHBORING RADIO BASE STATION ID | FREQUENCY | RECEIVED POWER LEVEL |
|---|---|---|
| 201 | F3 | -110dBm |
| 202 | F1 | -90dBm |
| | F2 | -113dBm |
| | F3 | -115dBm |
| 203 | F1 | -102dBm |
| | F2 | -110dBm |

OPERATION FREQUENCY SETTING METHOD, NETWORK DEVICE AND RADIO BASE STATION

TECHNICAL FIELD

The present invention relates to an operation frequency setting method, a network device and a radio base station for setting an operation frequency of the radio base station.

BACKGROUND ART

Generally, to satisfy service quality requirements for communication initiation requests transmitted from mobile stations at random, a mobile communication system requires the following complicated cell-system designing/evaluation works. Specifically, before construction of a radio base station for public communications, an installation location and a configuration of the radio base station for public communications, and radio-communication parameters such as a transmission power level of a downlink common control signal are designed on paper through simulations or the like with a service area (coverage areas) and traffic thereof estimated. Then, after the construction of the radio base station for public communications, measurement checks, maintenance and the like of the service area, communication quality or system capacity are repeatedly performed.

Although the above works are for a radio base station for public communications, basically the same works are expected to be performed also for a radio base station installed in a small area such as a home, which is referred to as a "home radio base station (Home eNB)."

SUMMARY OF THE INVENTION

However, since home radio base stations are flexibly installed in small areas such as homes, a much larger number of home base stations than that of the aforementioned radio base stations for public communications are expected to be installed. This causes a problem of an immense amount of labor required for the cell-system designing/evaluation works mentioned above.

Moreover, in an area such as an apartment building where households are closely packed together, home radio base stations are expected to be installed closely together accordingly, which leads to a problem that the cell-system designing/evaluation works mentioned above become extremely complicated.

Note that in selecting an operation frequency of a radio base station, use of a frequency different from those of radio signals transmitted by neighboring radio base stations is expected to produce an effect of avoiding interference. On the other hand, use of the same frequency as those of the radio signals transmitted by the neighboring radio base stations is expected to produce other effects such as preventing a mobile station from having connection delay due to switching of frequencies and reducing power consumption in a mobile station by omitting scan processing on different frequencies.

Hence, the present invention has been made in view of the above problems, and has an objective to provide an operation frequency setting method, a network device and a radio base station which are capable of appropriately and autonomously setting an operation frequency for each radio base station on the basis of local circumstances.

The first feature of the present invention is summarized in that a mobile communication method that is an operation frequency setting method for setting an operation frequency of a radio base station including step A of measuring by the radio base station a received power level of a common control signal transmitted by each of neighboring radio base stations, and step B of comparing each of the measured received power levels of the common control signals with a prescribed threshold and determining an operation frequency of the radio base station from among operation frequency candidates from which a frequency of a common control signal having a received power level higher than the prescribed threshold is excluded.

In the first feature of the present invention, in the step B, a frequency used by the largest number of radio base stations among the operation frequency candidates from which the frequency of the common control signal having the received power level higher than the predetermined threshold is excluded may be determined as the operation frequency of the radio base station.

In the first feature of the present invention, in the step B, an operation frequency of a neighboring radio base station having the highest priority among the operation frequency candidates from which the frequency of the common control signal having the received power level higher than the prescribed threshold is excluded may be determined as the operation frequency of the radio base station.

In the first feature of the present invention, in the step B, a priority of each neighboring radio base station may be determined according to the number of connectable mobile stations.

In the first feature of the present invention, in the step B, if there is no frequency of a common control signal having a received power level equal to or lower than the prescribed threshold, a frequency at which the maximum received power level is the lowest among maximum received power levels of respective frequencies of common control signals having received power levels higher than the prescribed threshold may be determined as the operation frequency of the radio base station.

The second feature of the present invention is summarized in that a network device configured to set an operation frequency of a radio base station, including an operation frequency determination unit configured to compare with a prescribed threshold each of received power levels of common control signals transmitted by neighboring radio base stations, which is notified by the radio base station, and determining the operation frequency of the radio base station from among operation frequency candidates from which a frequency of a common control signal having a received power level higher than the prescribed threshold is excluded.

In the second feature of the present invention, the operation frequency determination unit may determine as the operation frequency of the radio base station a frequency used by the largest number of radio base stations from among the operation frequency candidates from which the frequency of the common control signal having the received power level higher than the prescribed threshold is excluded from the operation frequency candidates.

In the second feature of the present invention, the operation frequency determination unit may determine, as an operation frequency of the radio base station, an operation frequency of a neighboring radio base station having the highest priority among the operation frequency candidates from which the frequency of the common control signal having the received power level higher than the prescribed threshold is excluded.

In the second feature of the present invention, the operation frequency determination unit may determine a priority of a neighboring radio base station according to the number of connectable mobile stations.

In the second feature of the present invention, if there is no frequency of a common control signal having a received power level equal to or lower than the prescribed threshold, the operation frequency determination unit may determine, as operation frequency of the radio base station, a frequency at which the maximum received power level is the lowest among maximum received power levels of respective frequencies of common control signals having received power levels higher than the prescribed threshold.

The third feature of the present invention is summarized in that a radio base station configured to set an operation frequency of a radio base station, including a measurement unit configured to measure a received power level of a common control signal transmitted from each of neighboring radio base stations, and an operation frequency determination unit configured to compare each of the measured received power levels of the common control signals with a prescribed threshold, and determine an operation frequency of the radio base station from among operation frequency candidates from which a frequency of a common control signal having a received power level higher than the prescribed threshold is excluded.

In the third feature of the present invention, the operation frequency determination unit may determine as the operation frequency of the radio base station a frequency used by the largest number of radio base stations from among the operation frequency candidates from which the frequency of the common control signal having the received power level higher than the prescribed threshold is excluded from the operation frequency candidates.

In the third feature of the present invention, the operation frequency determination unit may determine as the operation frequency of the radio base station an operation frequency of a neighboring radio base station having the highest priority among the operation frequency candidates from which the frequency of the common control signal having the received power level higher than the prescribed threshold being excluded.

In the third feature of the present invention, the operation frequency determination unit may determine a priority of a neighboring radio base station according to the number of connectable mobile stations.

In the third feature of the present invention, if there is no frequency of a common control signal having a received power level equal to or lower than the prescribed threshold, the operation frequency determination unit may determine as the operation frequency of the radio base station a frequency at which the maximum received power level is the lowest among maximum received power levels of respective frequencies of common control signals having received power levels higher than the prescribed threshold.

As described above, according to the present invention, it is capable of providing an operation frequency setting method, a network device and a radio base station appropriately and autonomously setting an operation frequency for each radio base station on the basis of local circumstances.

BEST MODES FOR CARRYING OUT THE INVENTION (Configuration of Mobile Communication System According to First Embodiment of Present Invention)

A description will be given of a configuration of a mobile communication system according to a first embodiment of the present invention with reference to FIG. 1 through FIG. 3.

Figure 1:
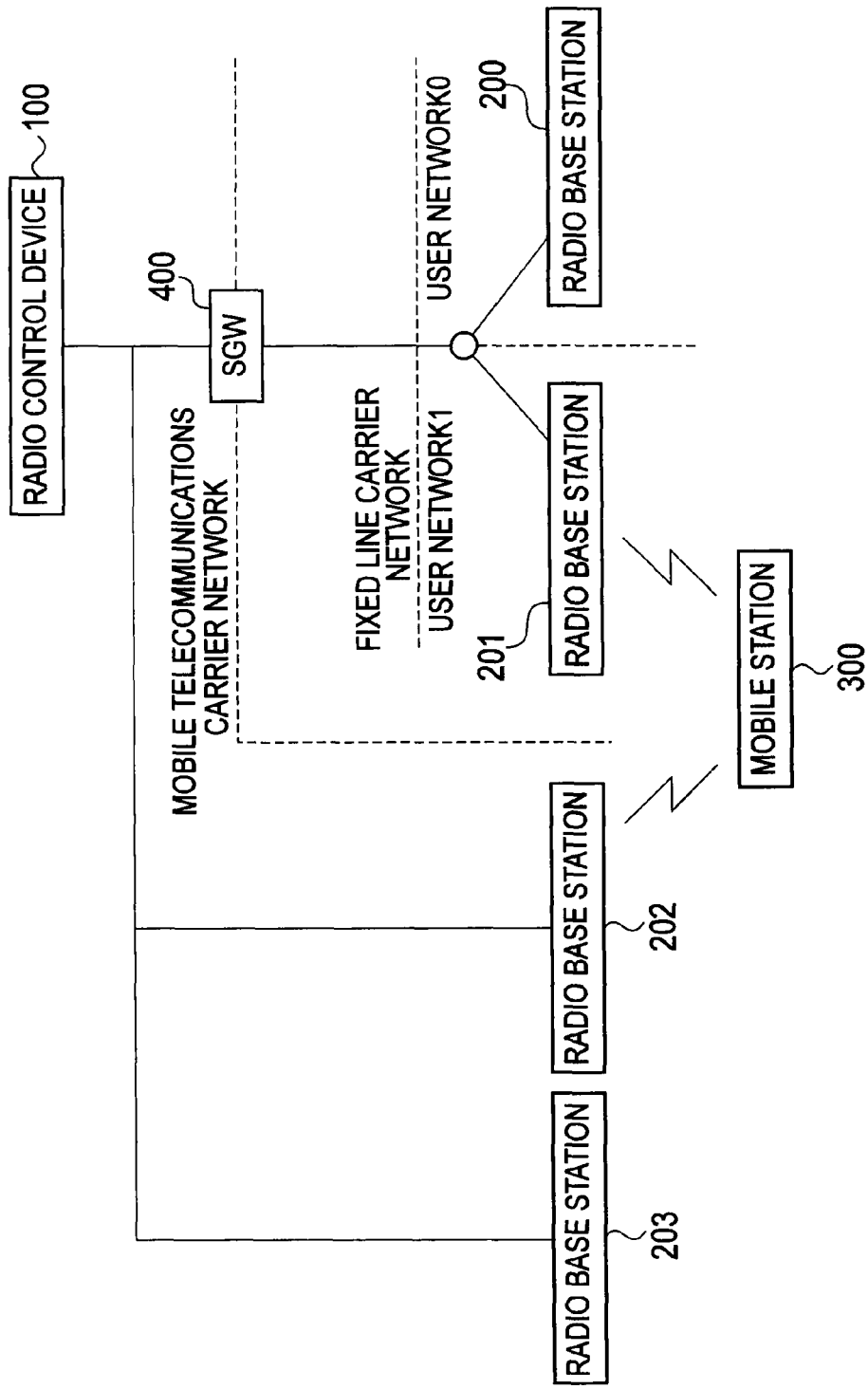
FIG. 1 is an overall configuration diagram of a mobile communication system according to a first embodiment of the present invention.

As shown in FIG. 1, the mobile communication system of this embodiment includes a radio control device (network device) 100, a security device SGW (security gateway) 400 and radio base stations 200 to 203.

Here, the radio base stations 200 to 203 are accommodated in the radio control device 100. In addition, the radio control device 100 is configured to: assign to the radio base stations 200 to 203 radio-communication parameters to be used between the radio base stations 200 to 203 and a mobile station 300; manage the radio-communication parameters; and the like.

Note that the radio base stations 202 and 203 are radio base stations for public communications installed in a mobile telecommunications carrier network which is managed by a mobile telecommunications carrier. Thus, a mobile station of a user of the mobile telecommunications carrier can connect to the radio base stations 202 and 203 without any specific limitations.

The radio base stations 200 and 201 are home radio base stations managed by users (owners of the radio base stations 200 and 201) subscribing to a communication service which is provided by the mobile telecommunications carrier.

For example, the radio base stations 200 and 201 are installed in a LAN (local area network) managed by the above-mentioned users, and are connected to the radio control device 100 in the mobile telecommunications carrier network via an FTTH or ADSL-access carrier network.

In addition, the radio base station 200 and radio base station 201 are assumed to be owned by different users, and a mobile station of one of the owners is not granted access to the radio base station of the other owner.

Meanwhile, the SGW 400 is installed at a border of the mobile telecommunications carrier network. The SGW 400 is a gateway device for protecting the mobile telecommunications carrier network from unauthorized access from other networks, and is configured to allow access to the mobile telecommunications carrier network only when the access is recognized as proper by an authentication procedure.

Figures 2, 3:
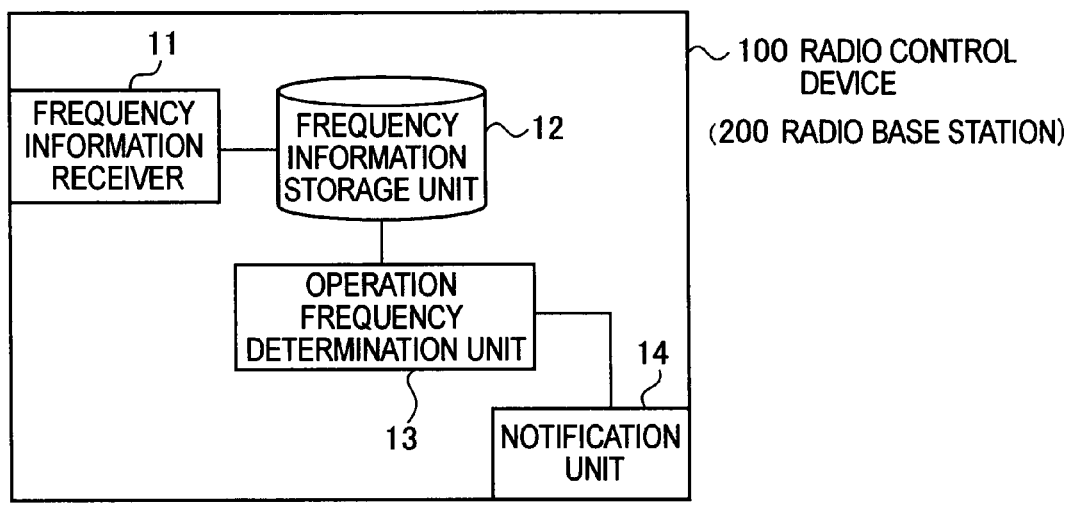
FIG. 2 is a functional block diagram of a radio control device according to the first embodiment of the present invention.
FIG. 3 is a diagram showing an example of frequency information managed by a frequency information storage unit of the radio control device according to the first embodiment of the present invention.

As shown in FIG. 2, the radio control device (network device) 100 includes a frequency information receiver 11, a frequency information storage unit 12, an operation frequency determination unit 13 and a notification unit 14.

The frequency information receiver 11 is configured to receive from a radio base station frequency information including measurement results of received power levels of common control signals transmitted from neighboring radio base stations The frequency information storage unit 12 is configured to store frequency information received by the frequency information receiver 11.

For example, the frequency information storage unit 12 is configured to store a "neighboring radio base station ID," a "frequency" and a "received power level" in association with each other for each radio base station, as shown in FIG. 3.

A "frequency" is information indicating a frequency used for transmission of common control signals by a radio base station specified by a "neighboring radio base station ID." A "received power level" is information indicating a received power level in the radio base station when receiving the common control signal transmitted by the radio base station specified by the "neighboring radio base station ID."

The operation frequency determination unit 13 is configured to determine an operation frequency of a radio base station.

To be specific, the operation frequency determination unit 13 is configured to compare with a prescribed threshold each received power level of a common control signal managed in the frequency information storage unit 12, and determine an operation frequency of the radio base station from among operation frequency candidates from which frequencies of common control signals having received power levels higher than the prescribed threshold are excluded.

In addition, the operation frequency determination unit 13 may be configured to determine, as an operation frequency of the radio base station, a frequency used by the largest number of radio base stations from among the operation frequency candidates from which the frequencies of the common control signals having the received power levels higher than the prescribed threshold are excluded.

Moreover, the operation frequency determination unit 13 may be configured to determine, as an operation frequency of the radio base station, an operation frequency of a neighboring radio base station having the highest priority from among the operation frequency candidates from which the frequencies of the common control signals having the received power levels higher than the prescribed threshold are excluded.

Here, the operation frequency determination unit 13 may be configured to determine a priority of a neighboring radio base station according to the number of connectable mobile stations.

Further, if there is no frequency of a common control signal having a received power level equal to or lower than the prescribed threshold, the operation frequency determination unit 13 may be configured to determine, as the operation frequency of the radio base station, a frequency at which the maximum received power level is the lowest among maximum received power levels at the respective frequencies of the common control signals having the received power levels higher than the prescribed threshold.

The notification unit 14 is configured to notify a radio base station of an operation frequency of the radio base station determined by the operation frequency determination unit 13.

(Operation of Mobile Communication System According to First Embodiment of Present Invention)

Figure 4:
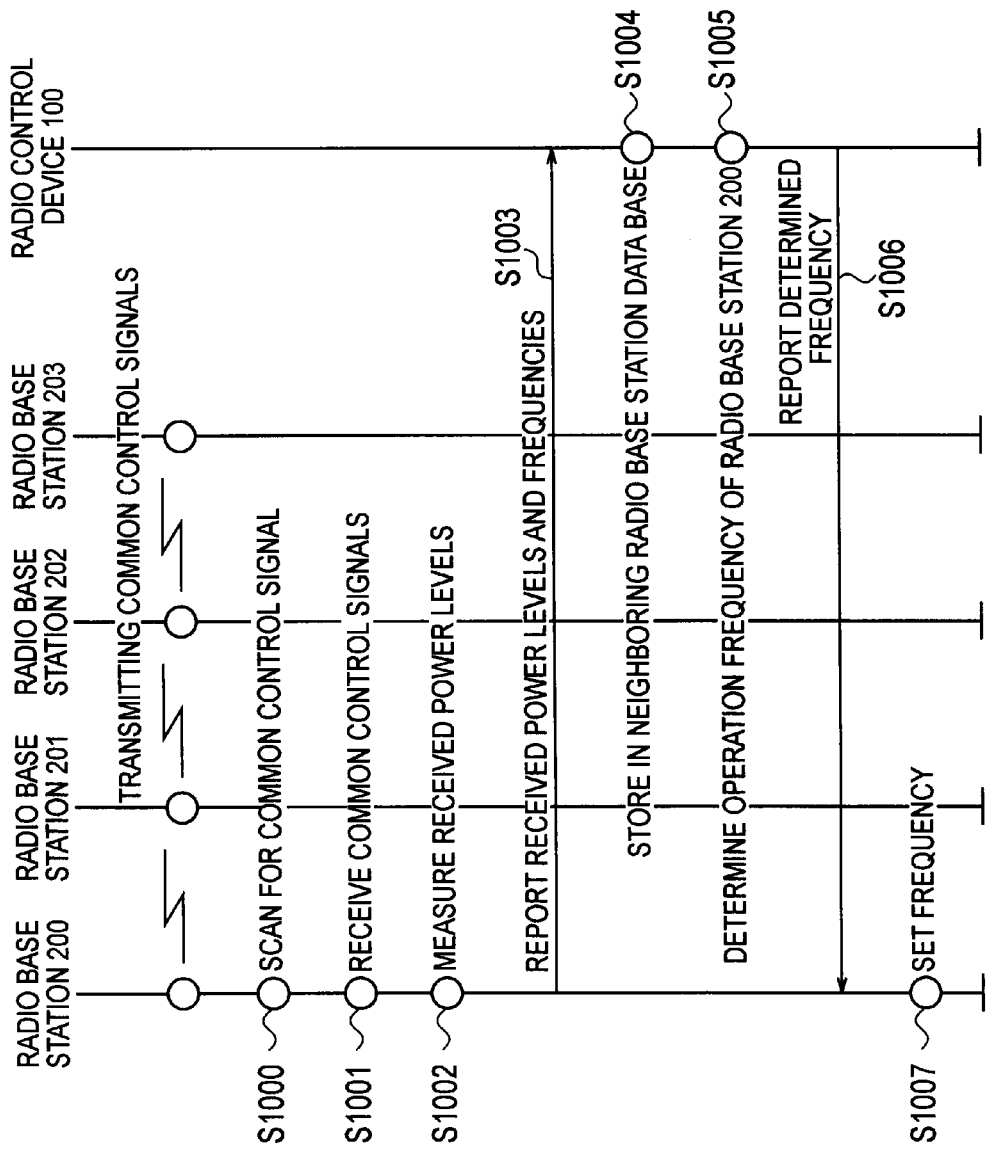
FIG. 4 is a sequence diagram showing an operation of the mobile communication system according to the first embodiment of the present invention.
Figure 5:
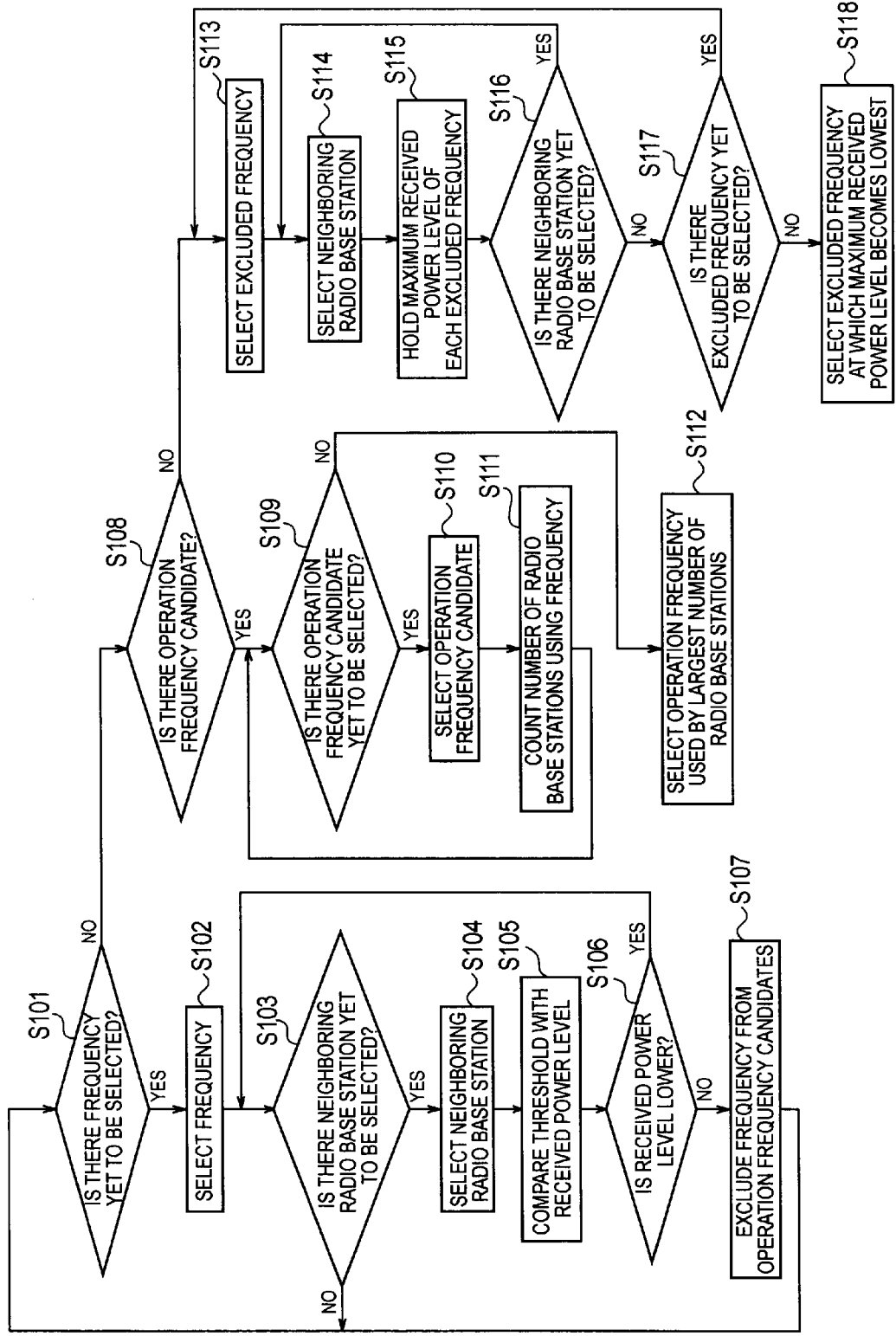
FIG. 5 is a flowchart showing an operation of determining an operation frequency of a radio base station by the radio control device according to the first embodiment of the present invention.

With reference to FIG. 4 and FIG. 5, a description will be given of an operation of the mobile communication system according to the first embodiment of the present invention, that is, an operation of setting an operation frequency of the radio base station 200 in a case of newly installing the radio base station 200 having a coverage area (service area) adjacent to coverage areas of the currently-operating radio base stations 201 to 203.

Note that although this operation is described for a case where the radio base station 200 is newly installed, the invention is also applicable to a case of automatically updating an operation frequency of a currently-operating radio base station.

As shown in FIG. 4, in step S1000, the newly-installed radio base station 200 attempts to receive common control signals transmitted by neighboring radio base stations.

In step S1001, the radio base station 200 receives common control signals transmitted by the radio base stations 201 to 203.

In step S1002, the radio base station 200 measures the received power levels of the common control signals transmitted by the radio base stations 201 to 203, and then in step S1003, notifies the radio control device 100 of frequency information including frequencies of the common control signals and measurement results of received power levels of the common control signals.

In step S1004, the radio control device 100 stores the received frequency information in a database for the radio base station 200 (frequency information storage unit 12) shown in FIG. 3.

In step S1005, the radio control device 100 determines an operation frequency of the radio base station 200 by referring to the database for the radio base station 200.

In step S1006, the radio control device 100 notifies the radio base station 200 of the determined operation frequency of the radio base station 200, and in step S1007, the radio base station 200 sets the notified operation frequency.

Hereinafter, a description will be given with reference to FIG. 5 of an operation in step S1005 of determining the operation frequency of the radio base station 200. Here, assume that the frequency information shown in FIG. 3 is stored as a database for the radio base station 200.

In determining in step S101 that there are frequencies yet to be selected, in step S102, the radio control device 100 selects a frequency from among the frequencies yet to be selected.

In determining in step S103 that there are neighboring radio base stations yet to be selected among neighboring radio base stations that use the selected frequency, the radio control device 100 selects a neighboring radio base station in step S104.

In step S105, the radio control device 100 compares with a prescribed threshold a received power level corresponding to the frequency selected in step S102 of the neighboring radio base station selected in step S104.

If it is determined in step S106 that the received power level is lower than the prescribed threshold, the operation returns to step S103, and if not, the operation proceeds to step S107.

In step S107, the radio control device 100 excludes from operation frequency candidates frequencies of common control signals having received power levels higher than the prescribed threshold.

By carrying out the operation of a loop of steps S101 to S107, the radio control device 100 can compare with the prescribed threshold each of the received power levels of the common control signals managed by the frequency information storage unit 12, and exclude from operation frequency candidates the frequencies of the common control signals having the received power levels higher than the prescribed threshold.

As a result, the radio control device 100 can compare with the prescribed threshold each of the received power levels of the common control signals managed by the frequency information storage unit 12, and determine an operation frequency of the radio base station from among the operation frequency candidates. At this time, frequencies of common control signals having received power levels higher than the prescribed threshold are excluded from the operation frequency candidates.

On the other hand, in determining in step S101 that there is no unselected frequency, in step S108, the radio control device 100 determines whether or not there are frequencies which are operation frequency candidates.

If it is determined that there are frequencies which are operation frequency candidates, and determined in step S109 that there are frequencies being operation frequency candidates which are yet to be selected, in step S110, the radio control device 100 selects a frequency from among the operation frequency candidates yet to be selected.

In step S111, the radio control device 100 counts the number of radio base stations which use the frequency selected in step S110, and the operation returns to step S109.

If it is determined in step S109 that there is no unselected frequency which is an operation frequency candidate, in step S112, the radio control device 100 determines, as an operation frequency of the radio base station, a frequency used by the largest number of radio base stations from among the operation frequency candidates. At this time, frequencies of common control signals having received power levels higher than the prescribed threshold are excluded from the operation frequency candidates.

If it is determined that there is no frequency which is an operation frequency candidate, in step S113, the radio control device 100 selects a frequency from among the frequencies excluded from the operation frequency candidates, that is, among the frequencies of the common control signals having the received power levels higher than the prescribed threshold.

In step S114, the radio control device 100 selects a radio base station from radio base stations using the frequency selected in step S113, and acquires a received power level at this frequency in the radio base station.

In step S115, the radio control device 100 holds the maximum received power at this frequency.

By carrying out the operation of a loop of steps S113 to S117, the radio control device 100 can acquire the maximum received power level for each of the frequencies of the common control signals having the received power levels higher than the prescribed threshold.

In step S118, the radio control device 100 determines a frequency having the lowest maximum received power level as an operation frequency of the radio base station.

In the example in FIG. 3, if the prescribed threshold for the radio base station 200 is set to "−100 dBm," the radio control device 100 excludes a frequency F1 from the operation frequency candidates in step S107 by considering that use of the frequency F1 at which one received power level is higher than the prescribed threshold leads to increase in an interference power level given to neighboring radio base stations and increase in interference power levels received from the neighboring radio base stations.

In addition, since there are frequencies F2 and F3 as frequencies having received power levels lower than the prescribed threshold in the example in FIG. 3, the radio control device 100 determines that the interference power level given to neighboring radio base stations and the interference power levels received from the neighboring radio base stations do not cause a problem in any of cases of using the frequency F2 or F3. Hence, in step S112, the radio control device 100 determines the frequency F2 which is used by a larger number of radio base stations as an operation frequency of the radio base station 200. The radio control device 100 makes this determination in expectation of an effect of preventing connection delay in a mobile station due to switching of frequencies, and reducing power consumption in a mobile station due to omission of scan processing on different frequencies.

In the example in FIG. 3, the numbers of neighboring radio base stations using the frequency F2 and frequency F3 are both "2." However, one of the neighboring radio base stations using the frequency F3 is the radio base station 201, and a mobile station held by an owner of the radio base station 200 is not connectable to the radio base station 201. Accordingly, the frequency F2 is used by a larger number of neighboring radio base stations connectable by a mobile station which can connect to the radio base station 200.

(Advantageous Effects of Mobile Communication System According to First Embodiment of Present Invention)

According to the mobile communication system of the first embodiment of the present invention, a coverage area of a home radio base station installed in a user LAN managed by a user of a mobile telecommunications carrier can be constructed at a frequency continuous with those of coverage areas of the neighboring radio base stations while avoiding interference from neighboring radio base stations.

First Modified Example

Although the above embodiment has been described by citing a W-CDMA mobile communication system as an example, the present invention is not limited to this, and is also applicable to an LTE (long term evolution) mobile communication system, for example.

Figure 6:
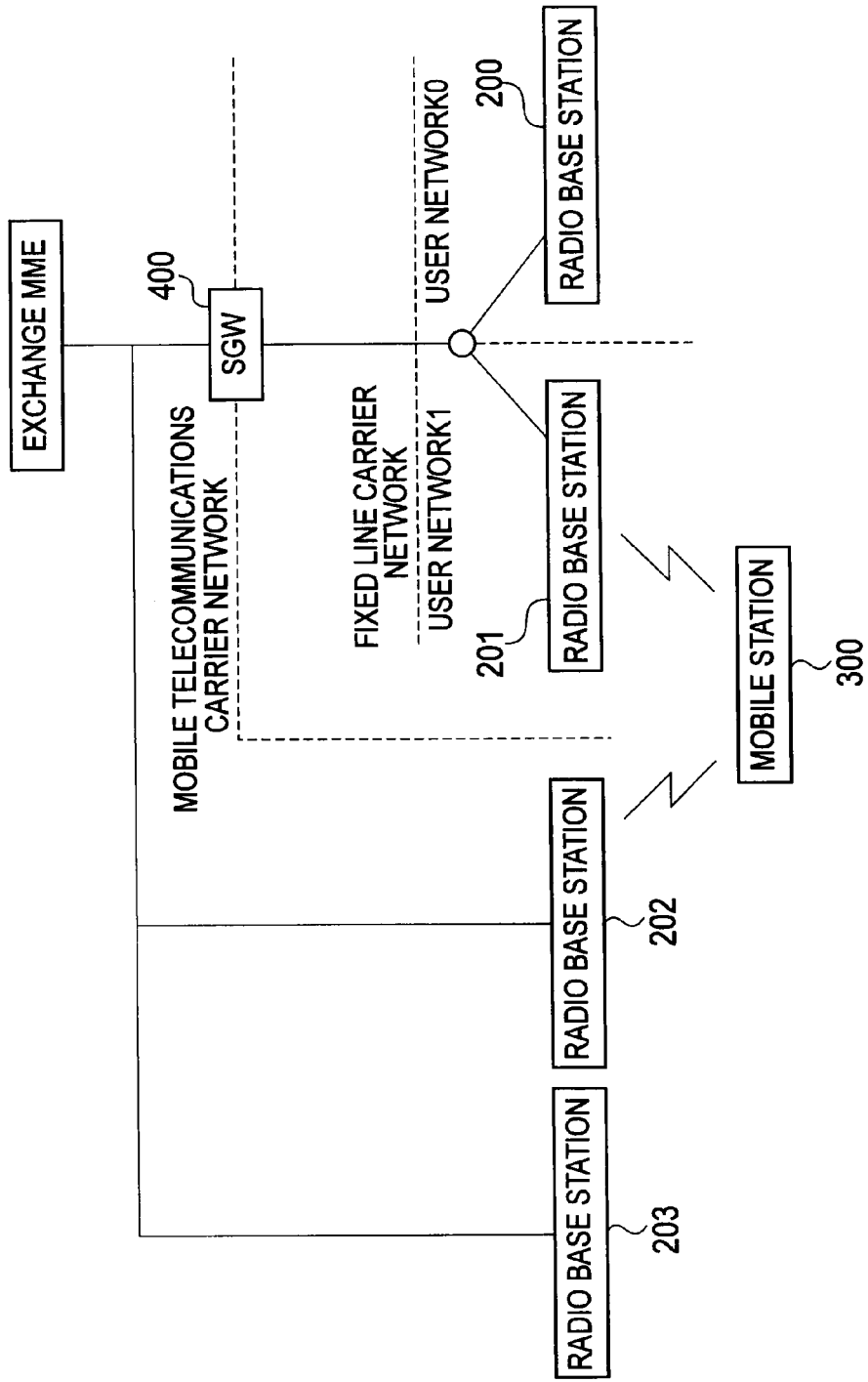
FIG. 6 is an overall configuration diagram of a mobile communication system according to a first modified example of the present invention.

As shown in FIG. 6, a mobile communication system according to a first modified example includes an exchange MME, a security device SGW (security gateway) 400 and radio base stations 200 to 203.

In this case, functions of the above-mentioned radio control device 100 are installed to a radio base station eNB or the exchange MME. In other words, in this first modified example, the radio base station eNB or the exchange MME is configured to serve as the above-mentioned network device.

In this first modified example, for example, as shown in FIG. 2, each of the radio base stations 200 and 201 includes a frequency information receiver 11, a frequency information storage unit 12, an operation frequency determination unit 13 and a notification unit 14. Functions of the units are the same as the functions of the units of the aforementioned radio control device 100.

The invention claimed is:

1. A mobile communication method that is an operation frequency setting method for setting an operation frequency of a radio base station comprising:
    step A of measuring by the radio base station a received power level of a common control signal transmitted by each of neighboring radio base stations; and
    step B of comparing each of the measured received power levels of the common control signals with a prescribed threshold and determining an operation frequency of the radio base station from among operation frequency candidates from which a frequency of a common control signal having a received power level higher than the prescribed threshold is excluded,
    wherein in the step B, an operation frequency of a neighboring radio base station having the highest priority among the operation frequency candidates from which the frequency of the common control signal having the received power level higher than the prescribed threshold is excluded is determined as the operation frequency of the radio base station.

2. The mobile communication method according to claim 1, wherein in the step B, a frequency used by the largest number of radio base stations among the operation frequency candidates from which the frequency of the common control signal having the received power level higher than the prescribed threshold is excluded is determined as the operation frequency of the radio base station.

3. The mobile communication method according to claim 1, wherein in the step B, a priority of each neighboring radio base station is determined according to the number of connectable mobile stations.

4. A mobile communication method that is an operation frequency setting method for setting an operation frequency of a radio base station comprising:
   step A of measuring by the radio base station a received power level of a common control signal transmitted by each of neighboring radio base stations; and
   step B of comparing each of the measured received power levels of the common control signals with a prescribed threshold and determining an operation frequency of the radio base station from among operation frequency candidates from which a frequency of a common control signal having a received power level higher than the prescribed threshold is excluded,
   wherein in the step B, if there is no frequency of a common control signal having a received power level equal to or lower than the prescribed threshold, a frequency at which the maximum received power level is the lowest among maximum received power levels of respective frequencies of common control signals having received power levels higher than the prescribed threshold is determined as the operation frequency of the radio base station.

5. A network device configured to set an operation frequency of a radio base station, comprising an operation frequency determination unit configured to compare with a prescribed threshold each of received power levels of common control signals transmitted by neighboring radio base stations, which is notified by the radio base station, and determining the operation frequency of the radio base station from among operation frequency candidates from which a frequency of a common control signal having a received power level higher than the prescribed threshold is excluded,
   wherein, the operation frequency determination unit determines, as an operation frequency of the radio base station, an operation frequency of a neighboring radio base station having the highest priority among the operation frequency candidates from which the frequency of the common control signal having the received power level higher than the prescribed threshold is excluded.

6. The network device according to claim 5, wherein the operation frequency determination unit determines as the operation frequency of the radio base station a frequency used by the largest number of radio base stations from among the operation frequency candidates from which the frequency of the common control signal having the received power level higher than the prescribed threshold is excluded from the operation frequency candidates.

7. The network device according to claim 5, wherein the operation frequency determination unit determines a priority of a neighboring radio base station according to the number of connectable mobile stations.

8. A network device configured to set an operation frequency of a radio base station, comprising an operation frequency determination unit configured to compare with a prescribed threshold each of received power levels of common control signals transmitted by neighboring radio base stations, which is notified by the radio base station, and determining the operation frequency of the radio base station from among operation frequency candidates from which a frequency of a common control signal having a received power level higher than the prescribed threshold is excluded,
   wherein if there is no frequency of a common control signal having a received power level equal to or lower than the prescribed threshold, the operation frequency determination unit determines, as operation frequency of the radio base station, a frequency at which the maximum received power level is the lowest among maximum received power levels of respective frequencies of common control signals having received power levels higher than the prescribed threshold.

9. A radio base station configured to set an operation frequency of a radio base station, comprising:
   a measurement unit configured to measure a received power level of a common control signal transmitted from each of neighboring radio base stations; and
   an operation frequency determination unit configured to compare each of the measured received power levels of the common control signals with a prescribed threshold, and determine an operation frequency of the radio base station from among operation frequency candidates from which a frequency of a common control signal having a received power level higher than the prescribed threshold is excluded,
   wherein the operation frequency determination unit determines as the operation frequency of the radio base station an operation frequency of a neighboring radio base station having the highest priority among the operation frequency candidates from which the frequency of the common control signal having the received power level higher than the prescribed threshold being excluded.

10. The radio base station according to claim 9, wherein the operation frequency determination unit determines as the operation frequency of the radio base station a frequency used by the largest number of radio base stations from among the operation frequency candidates from which the frequency of the common control signal having the received power level higher than the prescribed threshold is excluded from the operation frequency candidates.

11. The radio base station according to claim 9, wherein the operation frequency determination unit determines a priority of a neighboring radio base station according to the number of connectable mobile stations.

12. A radio base station configured to set an operation frequency of a radio base station, comprising:
   a measurement unit configured to measure a received power level of a common control signal transmitted from each of neighboring radio base stations; and
   an operation frequency determination unit configured to compare each of the measured received power levels of the common control signals with a prescribed threshold, and determine an operation frequency of the radio base station from among operation frequency candidates from which a frequency of a common control signal having a received power level higher than the prescribed threshold is excluded,
   wherein if there is no frequency of a common control signal having a received power level equal to or lower than the prescribed threshold, the operation frequency determination unit determines as the operation frequency of the radio base station a frequency at which the maximum received power level is the lowest among maximum received power levels of respective frequencies of common control signals having received power levels higher than the prescribed threshold.

* * * * *